United States Patent [19]

Stinnes

[11] 4,038,001

[45] July 26, 1977

[54] CENTRIFUGAL MOULDING

[76] Inventor: Wolf Walter Stinnes, 31 Johan Rissik Ave., Waterkloff Ridge, Pretoria, South Africa, 0002

[21] Appl. No.: 575,085

[22] Filed: May 6, 1975

[30] Foreign Application Priority Data

May 8, 1974 South Africa .............. 74/2928

[51] Int. Cl.² .................................... B29C 27/16
[52] U.S. Cl. .................................. 425/110; 156/74; 264/258; 264/311; 264/312; 264/270; 425/DIG. 33; 425/162; 425/426
[58] Field of Search ........... 264/257, 258, 310–312, 264/259, 267, 269, 270; 425/110, 115, 127, 392, 393, 402, 425, 426, DIG. 33, DIG. 225, 317, 162; 156/74; 269/8; 335/289

[56] References Cited

U.S. PATENT DOCUMENTS

| 2,859,151 | 11/1958 | Usab et al. | 264/311 |
| 3,012,922 | 12/1961 | Wiltshire | 264/311 |
| 3,150,219 | 9/1964 | Schmidt | 264/311 |
| 3,788,916 | 1/1974 | Gadelius | 156/74 |
| 3,900,355 | 8/1975 | Goto et al. | 264/270 |

Primary Examiner—Robert L. Spicer, Jr.

[57] ABSTRACT

Method and apparatus for producing glass fibre reinforced plastic pipes and the like wherein a rotatable hollow mould form is provided, an elongated roll of reinforcing fibres is located on holding means which are placed in the concavity of the mould, spaced from the sides of the mould, the mould is rotated and the fibre roll is unrolled onto the mould face to deposit fibres thereon and settable synthetic resinous material is introduced into the mould form. The holding means may be adapted to move the roll of reinforcing fibres from a position wherein it is spaced from the mould surface to a position wherein it is in contact therewith and the holding means may be rotatable with the leading edge of the roll secured until the roll has attained a suitable speed.

5 Claims, 2 Drawing Figures

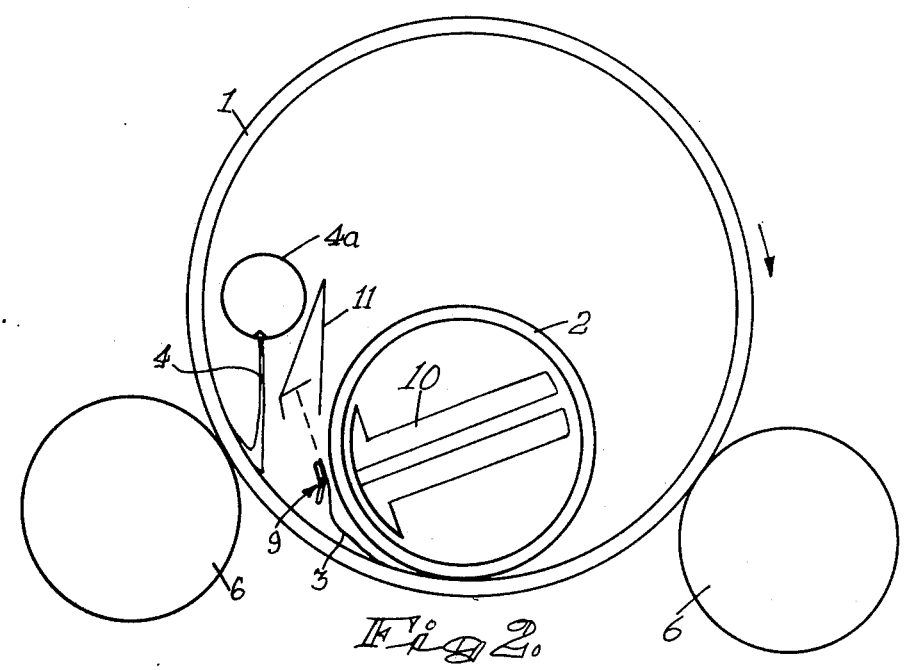

CENTRIFUGAL MOULDING

FIELD OF THE INVENTION

This invention relates to centrifugal moulding of synthetic resinous material.

BACKGROUND OF THE INVENTION

Several methods are commonly used for the production of glass fibre reinforced plastic pipes. Centrifugal moulding of such pipes involves rotating a tubular mould form about its axis while introducing the resin and short disorientated glass fibres into the mould. This method suffers from the disadvantage that due to the short length and random orientation of the fibres, the pipe produced has less than the attainable axial and tangential strength.

Another known centrifugal moulding method comprises arranging glass fibre filament or mat in the mould form prior to rotating the latter and introducing the resin. While greater strength may be achieved with this method it is more time consuming.

OBJECTS AND SUMMARY OF THE INVENTION

An object of the present invention is the provision of a novel centrifugal moulding method for synthetic resinous material, which the applicant believes has advantages over known methods.

According to the invention a method of moulding synthetic resinous material comprises providing a rotatable hollow mould form, locating an elongated roll of filler or reinforcing fibres in the concavity of the mould spaced from the sides of the latter, rotating the mould form, unrolling the fibre roll on the mould face to deposit fibres thereon and introducing settable synthetic resinous material into the mould form.

The resin may be introduced at any stage during the process of unrolling the fibre roll since centrifugal force will cause the resin to permeate the fibres. Preferably, however, resin is introduced continuously during unrolling.

Further, according to the invention, the fibre roll is unrolled by contacting it with the inner rotating mould face. Thus, frictional association between the mould face and roll causes the latter to rotate about its axis to unwind the fibres.

In a further form of the invention, the fibre roll is rotated and the leading end of the fibre released onto the mould when the tangential speeds of the roll and mould are the same.

Also included withing the scope of this invention is apparatus suitable for use in the above method comprising a rotatable hollow mould form with at least one axial opening, means for rotating the mould form about its axis, means for injecting settable synthetic resinous material into the mould form, and holding means for rotatably mounting a roll of filler or reinforcing fibres in the mould parallel to the axis thereof.

Further according to the invention the holding means is adapted to move the roll from a position wherein it is spaced from the mould surface to a position wherein it is in contact therewith. In one arrangement, where the mould has an axial opening at both of its ends, the holding means may comprise a pair of pivotally mounted arm members, one located at each end of the mould, the members being adapted rotatably to hold the roll between them. In a further arrangement, means is provided for rotating the holding means about its axis and for securing the leading edge of the roll until the roll has attained a suitable speed.

Preferably the securing means may be electro magnetically controlled.

Still further according to the invention the means for injecting resin into the mould comprises an elongated tube or the like, provided with a plurality of discharge nozzles along the length thereof.

The rotating means for the mould may take various forms, but where at least part of the outer surface of the mould is of circular configuration, the means may be in the nature of one or more drive rollers.

Also according to the invention the roll of fibres comprises a mandrel with a plurality of fibres thereon. The manner in which the fibres are located on the mandrel will determine their orientation on the mould face. Thus, for example, a fibre wound helically onto the mandrel will be deposited on the mould in helical fashion. In this manner the orientation of the fibres on the mould face is to a large degree predetermined. For high pressure pipes, it is desirable to have the fibres disposed parallel to the axis of the pipe and at right angles thereto. Such fibres may be wound onto the mandrel in the form of a fibre mat of the type disclosed in the Applicants' co-pending Patent Application entitled "Glass Fibre Mat".

Further included within the scope of this invention is a moulded article produced according to the above method.

In order more clearly to describe the invention, an example is given hereunder with reference to the accompanying drawings wherein;

DESCRIPTION OF THE FIGURES OF THE DRAWINGS

FIG. 2 is a schematic cross sectional view of the moulding apparatus in FIG. 1.

DESCRIPTION OF A PREFERRED EMBODIMENT

Figure 1:
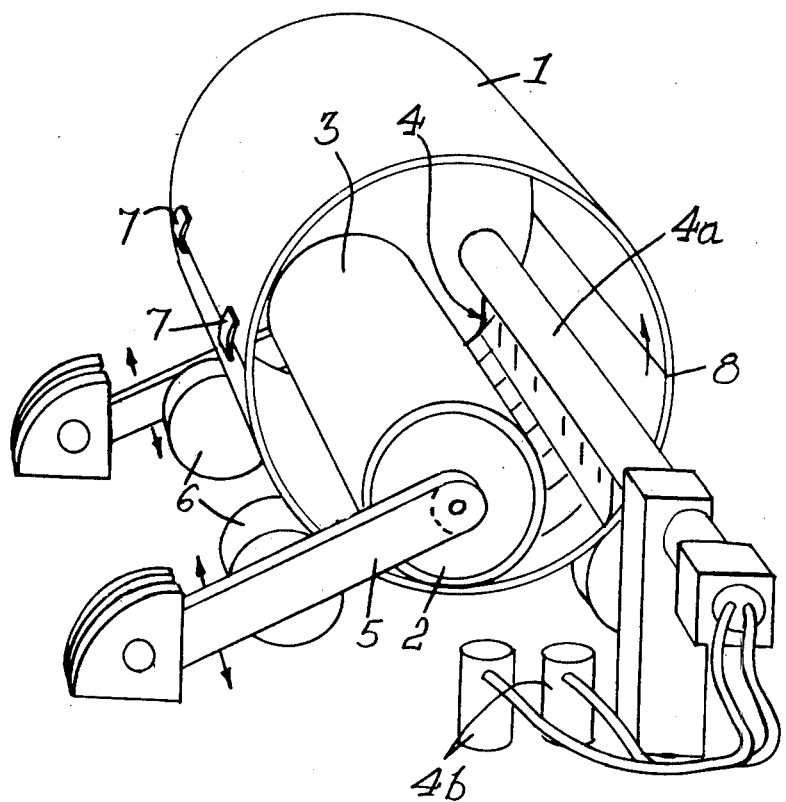
FIG. 1 is a perspective view of centrifugal moulding apparatus.

Referring to the drawings, moulding apparatus for moulding a pipe section includes a tubular mould form 1 of circular section, the mould 1 being located on rollers 6 for rotation about its axis. At least one roller 6 is driven by means of a motor (not shown) to effect such rotation.

Projecting into the concavity of the mould is a resin duct 4a for injecting settable synthetic resinous material into the mould. The duct 4a leads from one or more reservoirs 4b and preferably has a plurality of suitably located discharge nozzles, not shown, along its length.

Also located within the mould, parallel to the axis thereof, is a mandrel 2 carrying a mat 3 of reinforcing fibre glass. The mandrel 2 is rotatably mounted between a pair of pivotal arm members 5, as illustrated. By means of the arms 5, the mandrel 2 may be moved into contact with the inner face of the mould.

During moulding, the mould 1 is rotated at a speed where centrifugal force exceeds gravitational force; a first layer of resin 4 is introduced into the mould by way of the duct 4a; and the mandrel 2 lowered into contact with the inner mould face. Friction between mandrel and mould causes the former to rotate to unwind the fibres. Further required amounts of resin are injected into the mould during the unwinding process.

Where the adhesive properties of the first layer of resin is not sufficient to stick the first layer of the fibre mat to the mould, the mat is deposited onto the mould only after the mould has attained sufficient speed to keep the mat in position by centrifugal force. To effect this, means, not shown, is provided to rotate the mandrel 2. The mandrel is then rotated and the leading end of the mat 3 is held fast on the mandrel 2 by an electromagnetically operated securing device which consists of a strip of magnetic material 9, FIG. 2, which is attracted by an energised solenoid magnet 10, FIG. 2.

The mandrel is rotated to run at the tangential speed of the mould. When the desired speed of the mould is reached, the solenoid magnet 10 is de-energised, the strip 9 is flung into a trap 11 and the leading end of the mat 3 deposited onto the mould 1. The mat 3 will be more effectively released if the strip 9 is hinged as illustrated.

After setting, the moulded pipe section may be removed by opening the mould which is hinged at 7, FIG. 1, and latched at 8, FIG. 1.

It will be evident that the orientation of the fibres on the mandrel determines their orientation on the mould face and such orientation may accordingly be varied to suit design criteria. For high pressure piping axial and tangential fibres are usually indicated, and for the production of such piping a mat having such fibres may be provided in rolled up form on the mandrel.

The method and apparatus may also be used for the production of sheets by removing thinly moulded pipes from the mould, cutting the pipes open and laying them flat prior to the hardening of the resin.

The moulding method of the invention offers all the usual advantages of centrifugal moulding which need not be mentioned here and furthermore provides for selected orientation of reinforcing fibres and easy placement thereof.

Clearly many variations of the invention exist, each differing in matters of detail only, but in no way departing from the spirit of this disclosure.

We claim:

1. Apparatus suitable for moulding reinforcing fibres and a settable liquid bonding agent comprising:

a rotatable hollow mould form having at least one axial opening:

means for rotating the mould form about its longitudinal axis in actuating relationship with the mould form;

a rotatable mandrel located within the mould form parallel to the longitudinal axis thereof for rotatably mounting a multilayered roll of reinforcing fibres in the mould form;

rolling means adjacent the mould form for rotatably holding the mandrel within the mould form, the holding means being adapted to move the roll from a position wherein it is spaced from the mould form inner surface to a position wherein it is in contact therewith;

rotating means, on the holding means, for rotating the mandrel about its axis; and means for injecting a settable liquid bonding agent into the mould form located within the annular space of the mould form.

2. Apparatus as claimed in claim 1, wherein the mould form has an axial opening at both of its ends, the holding means comprising a pair of pivotably mounted arm members, one located at each end of the mould, the members being adapted to rotatably hold the mandrel between them.

3. Apparatus as claimed in claim 2, wherein the means for injecting the settable liquid bonding agent into the mould form comprises an elongated tube extending into and parallel to the axis of rotation of said mould form and provided with a plurality of discharged nozzles along the length thereof.

4. Apparatus as claimed in claim 3, comprising a hollow mandrel; an electromagnet located within the mandrel; and a trap located within the mould form for catching a strip of magnetic material released from the outer surface of the mandrel by deenergizing of the electromagnet.

5. Apparatus as claimed in claim 4, comprising a fibre-securing device in the form of a separate strip of magnetic material for positioning on the leading end of the fibre roll on the mandrel when the electromagnet is energized.

* * * * *